US012694553B2

(12) United States Patent
Kim et al.

(10) Patent No.: US 12,694,553 B2
(45) Date of Patent: Jul. 28, 2026

(54) APPARATUS AND METHOD FOR MEASURING DIMENSION

(71) Applicant: ELECTRONICS AND TELECOMMUNICATIONS RESEARCH INSTITUTE, Daejeon (KR)

(72) Inventors: Hye Jin S. Kim, Daejeon (KR); Ji Yeon Son, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 294 days.

(21) Appl. No.: 18/494,906

(22) Filed: Oct. 26, 2023

(65) Prior Publication Data

US 2024/0144512 A1 May 2, 2024

(30) Foreign Application Priority Data

Oct. 27, 2022 (KR) ........................ 10-2022-0140317
Jun. 1, 2023 (KR) ........................ 10-2023-0071077

(51) Int. Cl.
| | |
|---|---|
| *G06T 7/62* | (2017.01) |
| *G01C 3/02* | (2006.01) |
| *G06T 7/50* | (2017.01) |

(52) U.S. Cl.
CPC .................. *G06T 7/62* (2017.01); *G01C 3/02* (2013.01); *G06T 7/50* (2017.01); *G06T 2207/20081* (2013.01)

(58) Field of Classification Search
CPC . G06T 2207/20081; G06T 17/00; G06T 7/50; G06T 7/73; G06T 7/75;
(Continued)

(56) References Cited

U.S. PATENT DOCUMENTS

| | | |
|---|---|---|
| 10,043,285 B2 | 8/2018 | Kim |
| 2020/0265575 A1 | 8/2020 | Oota |

(Continued)

FOREIGN PATENT DOCUMENTS

| | | |
|---|---|---|
| JP | 2018-066586 A | 4/2018 |
| KR | 10-2024151 B1 | 9/2019 |

(Continued)

OTHER PUBLICATIONS

Mikel Ariz, Arantxa Villanueva, and Rafael Cabeza. 2019. Robust and accurate 2D-tracking-based 3D positioning method: Application to head pose estimation. Comput. Vis. Image Underst. 180, C (Mar. 2019), 13-22. (Year: 2019).*

*Primary Examiner* — Sumati Lefkowitz
*Assistant Examiner* — Aaron Joseph Sorrin
(74) *Attorney, Agent, or Firm* — LRK PATENT LAW FIRM

(57) ABSTRACT

Disclosed are an apparatus and method for measuring a dimension. The method of measuring a dimension according to an aspect of the present invention includes photographing a target object and generating an image, normalizing the image of the target object, generating normalized estimated dimension information about the target object from the normalized image of the target object using a pre-trained dimension prediction model, and converting the normalized estimated dimension information of the target object into estimated dimension information of the target object.

17 Claims, 6 Drawing Sheets

(58) Field of Classification Search
CPC . G06T 2207/10028; G06T 7/62; G06V 10/82;
G06V 10/7715; G06V 20/647; G01C 3/02
See application file for complete search history.

(56) References Cited

U.S. PATENT DOCUMENTS

| | | | |
|---|---|---|---|
| 2021/0241450 A1 | 8/2021 | Kim et al. | |
| 2021/0279841 A1* | 9/2021 | Liu | G06V 10/82 |
| 2022/0414911 A1* | 12/2022 | Wang | G06T 17/00 |
| 2023/0114432 A1 | 4/2023 | Zhao et al. | |
| 2023/0410561 A1* | 12/2023 | Awada | G06V 40/28 |

FOREIGN PATENT DOCUMENTS

| | | | |
|---|---|---|---|
| KR | 10-2021-0097623 A | 8/2021 |
| KR | 10-2335237 B1 | 12/2021 |
| KR | 10-2022-0000896 A | 1/2022 |

* cited by examiner

START

| GENERATE IMAGE THROUGH CAMERA | S201 |

| GENERATE DEPTH INFORMATION THROUGH SENSOR | S203 |

| PERFORM PREPROCESSING ON IMAGE | S205 |

| PERFORM NORMALIZATION ON IMAGE | S207 |

| GENERATE NORMALIZED ESTIMATED DIMENSION INFORMATION | S209 |

| CONVERT NORMALIZED ESTIMATED DIMENSION INFORMATION INTO ESTIMATED DIMENSION INFORMATION | S211 |

END

APPARATUS AND METHOD FOR MEASURING DIMENSION

CROSS-REFERENCE TO RELATED APPLICATIONS

This application claims priority to and the benefit of Korean Patent Application No. 10-2022-0140317, filed on Oct. 27, 2022 and Korean Patent Application No. 10-2023-0071077, filed on Jun. 1, 2023, which are hereby incorporated by reference for all purposes as if set forth herein.

BACKGROUND

1. Field of the Invention

The present invention relates to an apparatus and method for measuring a dimension, and more specifically, to an apparatus and method for measuring a dimension, in which a dimension of an object is estimated using an image captured through a single camera.

2. Description of Related Art

Generally, dimension measurement technologies may be broadly divided into contact and non-contact type technologies. A contact type dimension measurement method is a method of measuring a dimension through direct contact with an object to be measured, and has a disadvantage of damaging the object due to contact that occurs during a dimension measurement process, and accordingly, a non-contact type dimension measurement method is widely used. Examples of non-contact type dimension measurement methods include methods using sensors such as a two-dimensional (2D) line laser, a three-dimensional (3D) line laser, a structured light sensor, and the like, and methods using cameras such as a stereo camera, a multi-stereo camera, and the like.

A method of measuring a dimension using a 2D line laser has an advantage of being cheaper than a method of measuring a dimension using a sensor such as a 3D line laser, a structured light sensor, or the like, but has a disadvantage of not being suitable for measuring a dimension of a large area.

A method of measuring a dimension using a 3D line laser is a method of measuring a dimension of an object by integrating sensing values measured through a 2D line laser, and it is necessary to move a stand on which the object is placed or the line laser, and accordingly, it costs more to measure the dimension compared to a method of measuring a dimension using a 2D line laser.

A method of measuring a dimension using a structured light sensor is a method of irradiating an object with patterned light, photographing a shape of a pattern formed on a surface of the object with a camera, and analyzing a captured image to measure a dimension of the object, and although this enables the dimension of the object to be measured with high accuracy, the accuracy may be lower when a structure of a target object is complex. For example, when a hole is formed in the target object, it is difficult to accurately measure a dimension of a region in which the hole is formed.

In a method of measuring a dimension using stereo or multi-stereo cameras, a dimension is measured using a distance between the cameras as a baseline, and thus there is a disadvantage in that, as the cameras age, the accuracy of dimension measurement decreases.

The related art of the present invention is disclosed in Korean Laid-open Patent Publication No. 10-2021-0097623 (Aug. 9, 2021).

SUMMARY OF THE INVENTION

The present invention is directed to providing an apparatus and method for measuring a dimension, in which a dimension of an object can be estimated with high accuracy from a two-dimensional (2D) image captured through a single camera using a deep learning model.

According to an aspect of the present invention, there is provided a method of measuring a dimension, which includes photographing a target object and generating an image, normalizing the image, generating normalized estimated dimension information about the target object from the normalized image using a pre-trained dimension prediction model, and converting the normalized estimated dimension information into estimated dimension information.

In the normalizing of the image, depth information about the target object may be generated, and the image may be normalized using a pre-trained normalization model and the depth information.

In the normalizing of the image, an average value and standard deviation corresponding to the depth information may be detected using the normalization model, and the image may be normalized using the detected average value and standard deviation.

In the converting of the normalized estimated dimension information, depth information about the target object may be generated, and the normalized estimated dimension information may be denormalized using the pre-trained denormalization model and the depth information and converted into the estimated dimension information.

In the converting of the normalized estimated dimension information, conversion parameters corresponding to the depth information may be detected using the denormalization model, and the normalized estimated dimension information may be denormalized using the detected conversion parameters.

The present invention may further include, before the generating of the normalized estimated dimension information, training a normalization model, a dimension prediction model, and a denormalization model using a plurality of databases in which training images, correct answer dimension information about the training images, and depth information are stored separately for each photographing environment.

The training of the normalization model, the dimension prediction model, and the denormalization model may include performing a process, in which the training images and the correct answer dimension information stored in the databases are normalized and the dimension prediction model is trained using the normalized training images and the normalized correct answer dimension information, on each of the plurality of databases.

The training of the normalization model, the dimension prediction model, and the denormalization model may further include performing a process, in which an average value and a standard deviation calculated in the process of normalizing the training images are matched with the depth information and stored, on each of the plurality of databases, and training the normalization model using the stored information.

The training of the normalization model, the dimension prediction model, and the denormalization model may further include performing a process, in which conversion parameters are calculated using the normalized training images and the normalized correct answer dimension information, and the dimension prediction model and the conversion parameters are matched with the depth information and stored, on each of the plurality of databases, and training the denormalization model using the stored information.

According to another aspect of the present invention, there is provided an apparatus for measuring a dimension, which includes a camera, a sensor, and a processor connected to the camera and the sensor, wherein the processor photographs a target object to generate an image through the camera, normalizes the image, generates normalized estimated dimension information about the target object from the normalized image using a pre-trained dimension prediction model, and converts the normalized estimated dimension information into estimated dimension information.

According to still another aspect of the present invention, there is provided an apparatus for measuring a dimension, which includes a camera configured to photograph a target object and generate a 2D image, a sensor configured to detect a distance to a place where the target object is placed and generate depth information, and a processor configured to normalize the 2D image generated through the camera using the depth information, generate normalized estimated dimension information about the target object from the normalized image using a pre-trained dimension prediction model, and convert the normalized estimated dimension information into estimated dimension information using the depth information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter an apparatus and method for measuring a dimension according to embodiments of the present invention will be described with reference to the accompanying drawings. In this process, thicknesses of lines, sizes of components, and the like shown in the accompanying drawings may be exaggerated for clarity and convenience of description. Further, some terms which will be described below are defined in consideration of functions in the present invention and meanings may vary depending on, for example, a user or operator's intentions or customs. Therefore, the meanings of these terms should be interpreted based on the scope throughout this specification.

Figure 1:
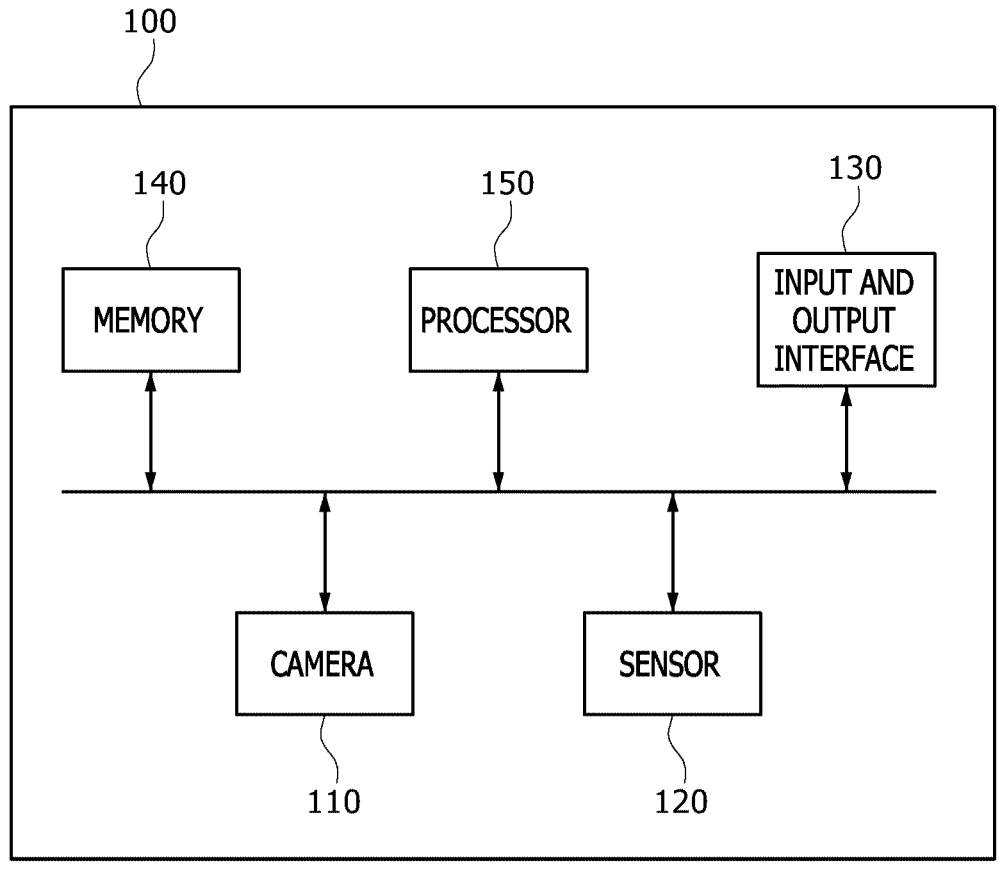
FIG. 1 is a block diagram illustrating an apparatus for measuring a dimension according to an embodiment of the present invention.

FIG. 1 is a block diagram illustrating an apparatus for measuring a dimension according to an embodiment of the present invention.

Referring to FIG. 1, an apparatus 100 for measuring a dimension according to the embodiment of the present invention may include a camera 110, a sensor 120, an input and output interface 130, a memory 140, and a processor 150 that communicate through a bus 160. Each of the above components may be connected through an individual interface or individual bus centered on the processor 150, rather than through the common bus 160.

The camera 110 may photograph an object to generate an image, and output the generated image to the processor 150 under the control of the processor 150, which will be described below. The camera 110 may be installed to face the object at a location vertically spaced a predetermined distance from a place where the object is placed (e.g., an examination table). The camera 110 may be a single camera, and may photograph the object to generate a two-dimensional (2D) red, green, and blue (RGB) image. The image captured through the camera 110 may be used to estimate a dimension of the object.

The sensor 120 may detect a distance from the camera 110 to the place where the object is placed (e.g., the examination table), and output information about the detected distance to the processor 150 under the control of the processor 150. For example, the sensor 120 may be a 2D line laser, and detect a vertical distance from a straight line (laser line) region crossing the object to the camera 110 to detect a vertical distance between the camera 110 and the object and a vertical distance between the camera 110 and the place where the object is placed. The sensor 120 is not limited to a 2D line laser, and various devices (e.g., radar and lidar) that can detect a distance may be used as the sensor 120. The information about the distance detected through the sensor 120 may be used to identify a photographing environment. Meanwhile, hereinafter, for convenience of description, the vertical distance from the camera 110 to the object or the place where the object is placed is expressed as a depth, and a height (i.e., a thickness of the object) of the object from a bottom surface on which the object is placed is expressed as a dimension.

The input and output interface 130 may receive data from the outside and output the received data to the processor 150, which will be described below. Further, the input and output interface 130 may output results calculated by the processor 150 to the outside.

In the memory 140, various types of information required while the processor 150 operates may be stored. Further, in the memory 140, various types of information calculated while the processor 150 operates may be stored.

The processor 150 may be operatively connected to the camera 110, the sensor 120, the input and output interface 130, and the memory 140. The processor 150 may be implemented as a central processing unit (CPU), a micro controller unit (MCU), or a system on chip (SoC), and the processor 150 may control a plurality of hardware or software components connected to the processor 150 by driving an operating system or application, perform various types of data processing and calculations, execute at least one command stored in the memory 140, and store result data of the execution in the memory 140.

The processor 150 may photograph a target object to generate an image through the camera 110, detect a vertical distance from the camera 110 to a place where the target object is placed to generate depth information through the sensor 120, normalize the image using the depth information, generate normalized estimated dimension information about the target object on the basis of the normalized image, and generate estimated dimension information about the target object on the basis of the normalized estimated dimension information and the depth information. A specific process in which the processor 150 estimates a dimension of the target object will be described below.

Figure 2:
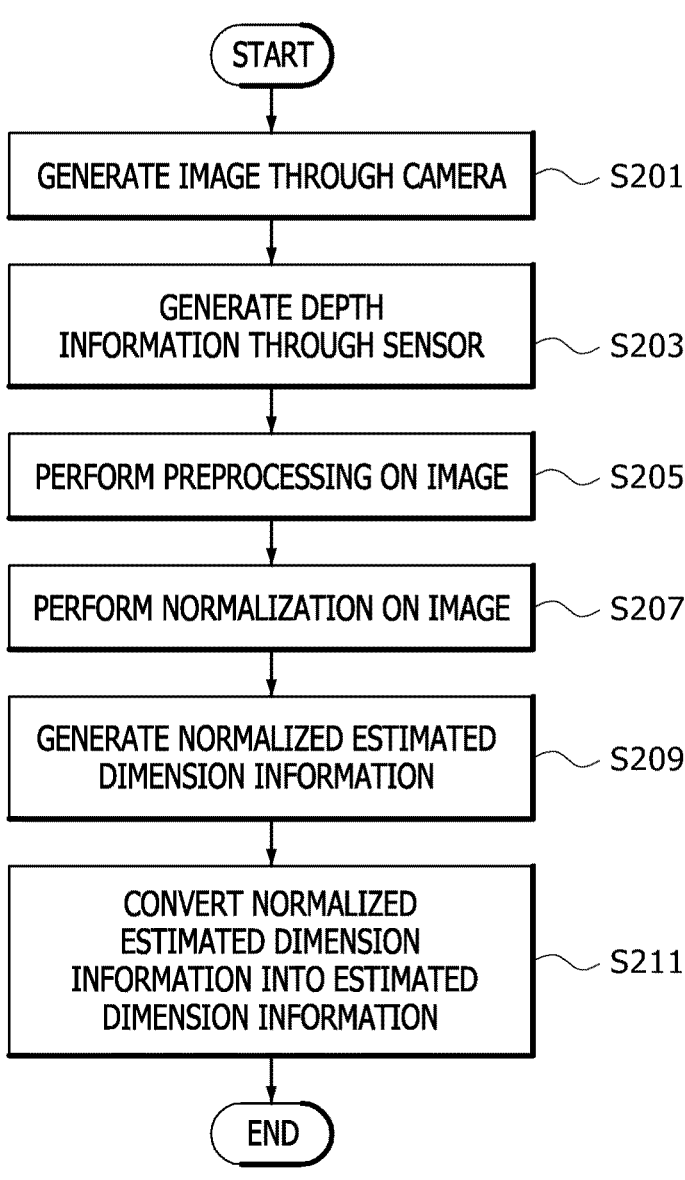
FIG. 2 is a flowchart illustrating an operation process of the apparatus for measuring a dimension according to the embodiment of the present invention.
Figure 3:
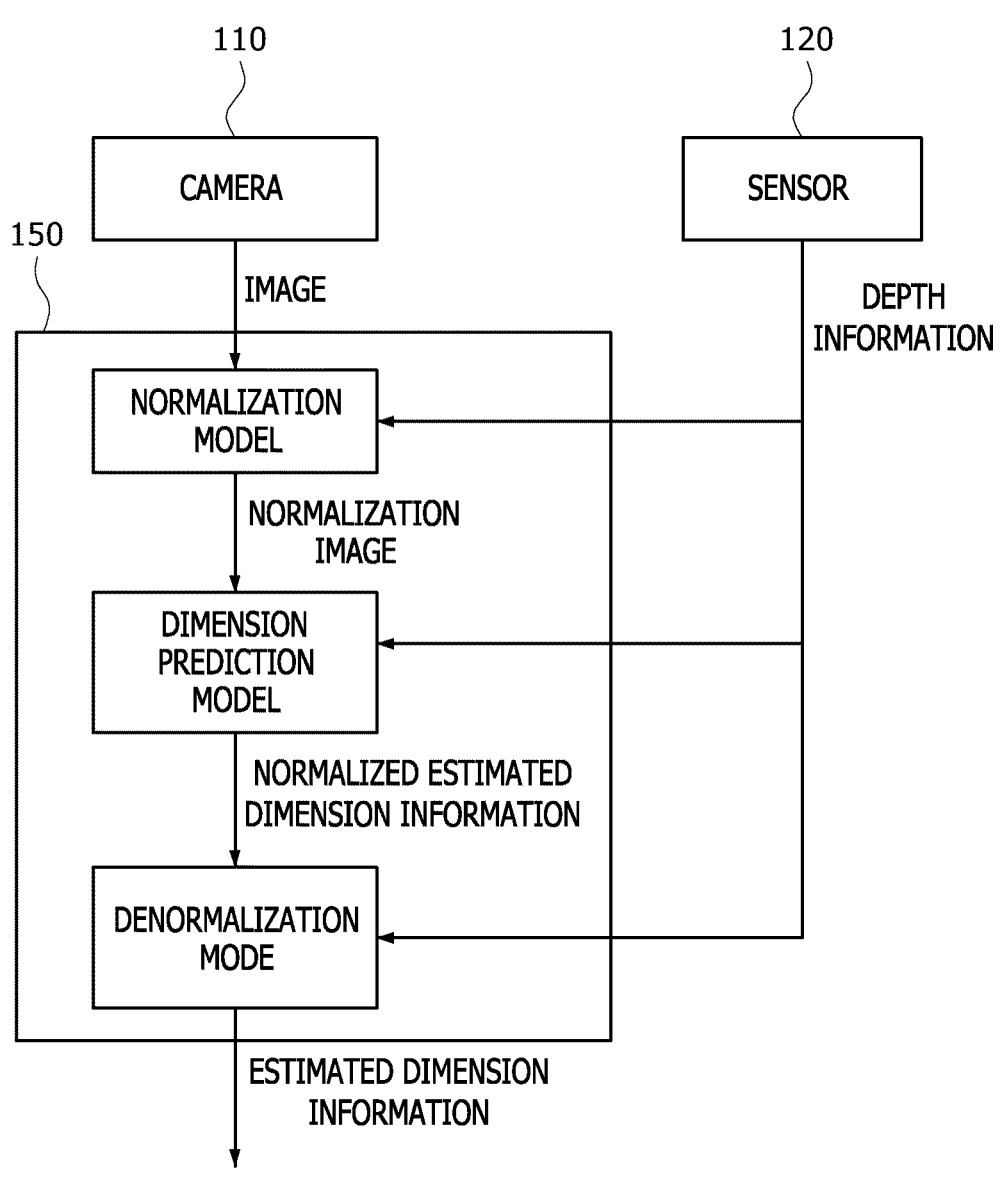
FIG. 3 is a conceptual diagram illustrating the operation process of the apparatus for measuring a dimension according to the embodiment of the present invention.

FIG. 2 is a flowchart illustrating an operation process of an apparatus for measuring a dimension according to an embodiment of the present invention, and FIG. 3 is a conceptual diagram illustrating the operation process of the apparatus for measuring the dimension according to the embodiment of the present invention.

Hereinafter, a process in which a processor 150 estimates a dimension of a target object from an image captured through a camera 110 will be described with reference to FIGS. 2 and 3. Some processes described below may be performed in a different order from the order described below or may be omitted.

First, the processor 150 may photograph the target object to generate an image through the camera 110 (S201). The processor 150 may generate a 2D RGB image of the target object through the camera 110.

Next, the processor 150 may detect a vertical distance from the camera 110 to a place where the target object is placed (e.g., an examination table) to generate depth information through a sensor 120 (S203).

Next, the processor 150 may perform preprocessing on the image generated through the camera 110 (S205). In this stage, the processor 150 may crop the image to extract only a region of interest. Further, the processor 150 may resize the image so that a size of the image becomes a preset reference size.

Next, the processor 150 may normalize the preprocessed image (S207). The processor 150 may normalize the image generated through the camera 110 using a pre-trained normalization model and the depth information generated through the sensor 120. Here, the normalization model is a model that normalizes and outputs an input image, and may be configured to receive the image generated through the camera 110 and the depth information generated through the sensor 120 and output a normalized image. In this stage, data values such as brightness, saturation, etc. may be normalized.

The normalization model may be configured to learn relationship information about an average value and a standard deviation according to the depth information, and the normalization model may detect the average value and standard deviation corresponding to the depth information generated through the sensor 120 from the relationship information and normalize an image using the detected average value and standard deviation.

Next, the processor 150 may generate normalized estimated dimension information about the target object on the basis of the normalized image (S209). The normalized estimated dimension information is an estimated value for the dimension of the target object, and may be a normalized value. The processor 150 may generate the normalized estimated dimension information from the normalized image using a pre-trained dimension prediction model. Here, the dimension prediction model is a model that outputs normalized estimated values for dimensions of objects included in an image when the image is input, and may be configured to receive a normalized image and output normalized estimated dimension information. The dimension prediction model may train features related to the dimensions of the objects in the image, and estimate the dimensions of the objects from the image using the trained features. The dimension prediction model may use the depth information generated through the sensor 120 in the process of estimating the dimensions of the objects from the image.

Next, the processor 150 may convert the normalized estimated dimension information about the target object into estimated dimension information about the target object (S211). The processor 150 may denormalize the normalized estimated dimension information using a pre-trained denormalization model and the depth information generated through the sensor 120 and convert the denormalized estimated dimension information into estimated dimension information. Here, the denormalization model is a model that denormalizes and outputs input estimated dimension information, and may be configured to receive estimated dimension information and output the estimated dimension information. The estimated dimension information output through the denormalization model may correspond to an estimated dimension value converted into an actual scale.

The denormalization model may be configured to learn relationship information about conversion parameters according to the depth information, and the denormalization model may detect the conversion parameters corresponding to the depth information generated through the sensor 120 from the relationship information, and apply the detected conversion parameters to the normalized estimated dimension information to calculate the estimated dimension information. The denormalization model may convert the normalized estimated dimension information into the estimated dimension information through Equation 1 below.

$$d_{absolute} = s * d_{relative} + c \qquad \text{[Equation 1]}$$

Here, $d_{absolute}$ may denote the estimated dimension information, $d_{relative}$ may denote the normalized estimated dimension information, s may denote a scale parameter included in the conversion parameters, and c may denote a shift parameter included in the conversion parameters. That is, the conversion parameters may consist of the scale parameter and the shift parameter.

Figure 4:
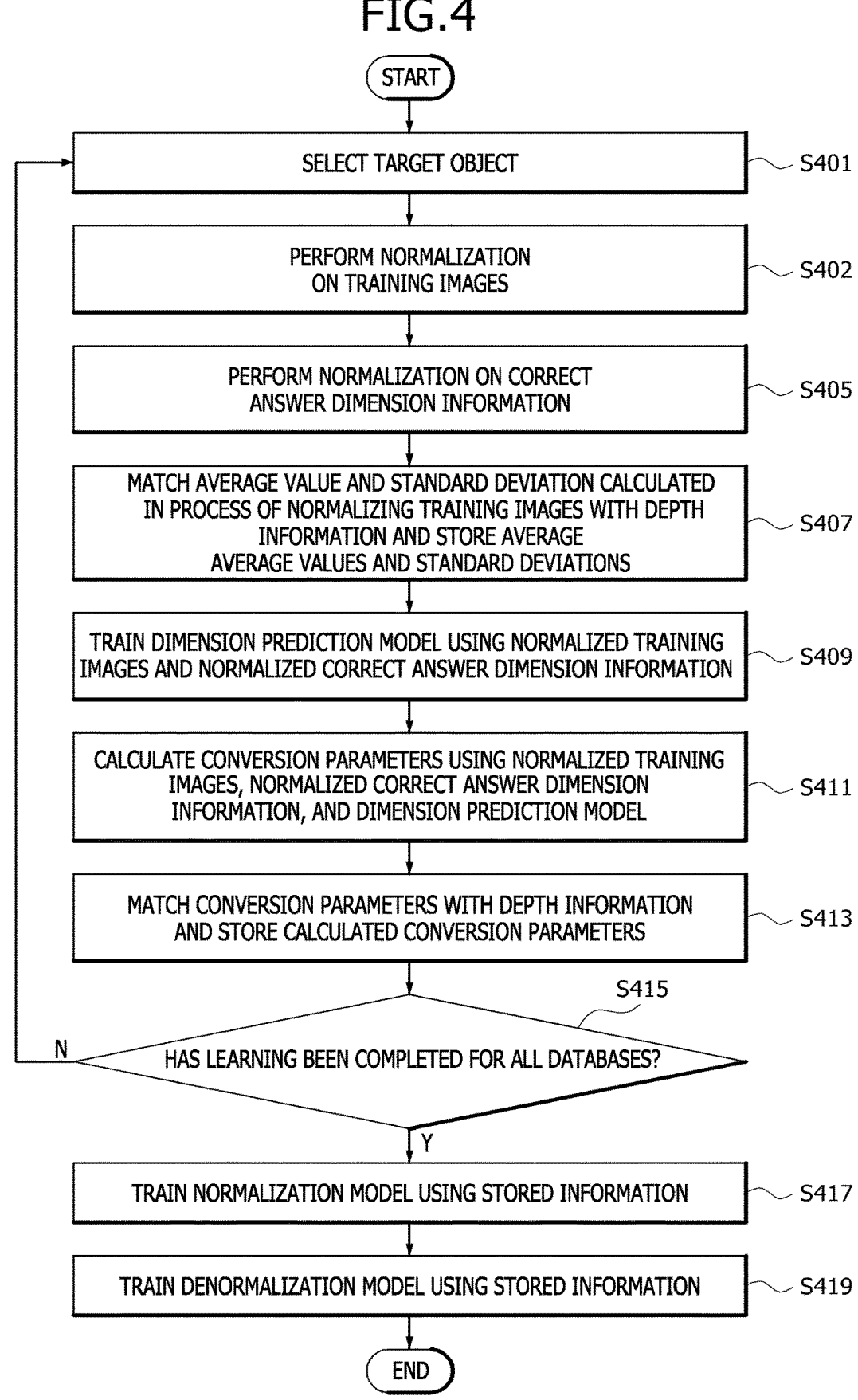
FIG. 4 is a flowchart illustrating a training process of the apparatus for measuring a dimension according to the embodiment of the present invention.
Figure 5:
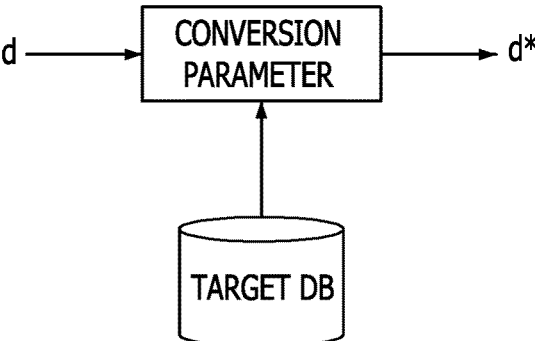
FIG. 5 is a conceptual diagram illustrating a process of calculating conversion parameters according to an embodiment of the present invention.
Figure 6:
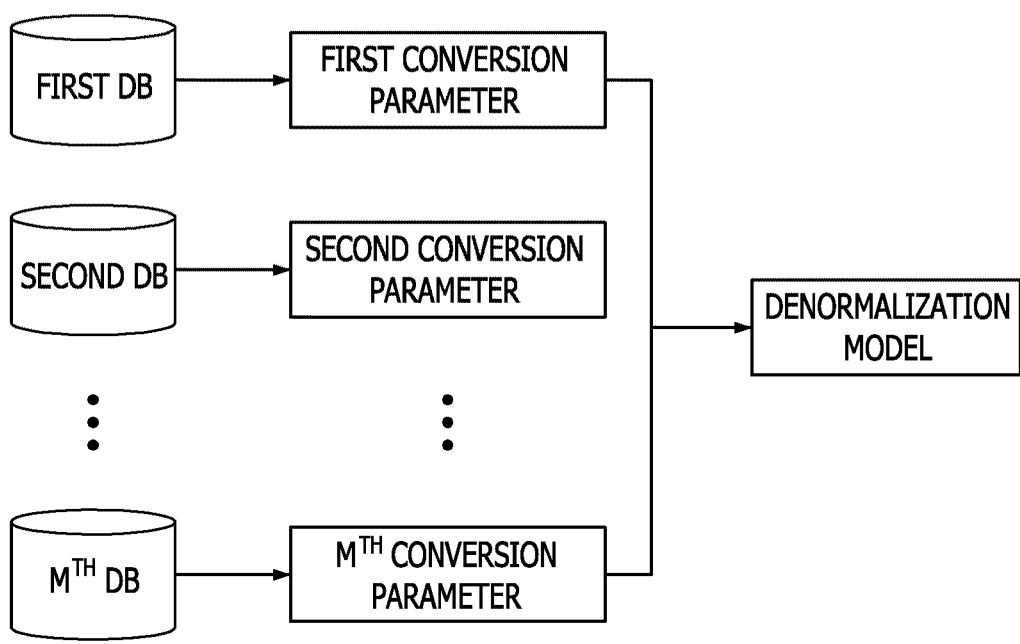
FIG. 6 is a conceptual diagram illustrating a process of calculating a denormalization model according to an embodiment of the present invention.

FIG. 4 is a flowchart illustrating a training process of an apparatus for measuring a dimension according to an embodiment of the present invention, FIG. 5 is a conceptual diagram illustrating a process of calculating conversion parameters according to the embodiment of the present invention, and FIG. 6 is a conceptual diagram illustrating a process of calculating a denormalization model according to the embodiment of the present invention.

Hereinafter, a process in which a processor 150 trains each of models included in the apparatus for measuring a dimension will be described with reference to FIG. 4. Some processes described below may be performed in a different order from the order described below or may be omitted.

First, one of a plurality of databases in which training images, correct answer dimension information corresponding to the training images, and depth information (a vertical distance from a camera 110 to a place where an object is placed) are separately stored for each photographing environment may be selected as a target database (S401). In each database, training images captured in different photographing environments and information about correct answer dimension information corresponding to the training images may be stored. Here, the training image may be an image obtained by photographing the object, and the correct answer dimension information may be an actual dimension value of the corresponding object. Further, the different photographing environments may mean that types of the cameras 110, locations of the cameras 110, poses of the cameras 110, types of objects to be photographed, and the like are different.

The training images and the correct answer dimension information may be collected through actual experiments, or may be generated through simulation. That is, the processor 150 may obtain the correct answer dimension information and the training images by generating the correct answer dimension information and the training images corresponding to the correct answer dimension information through simulation. The processor 150 may receive and use data from the plurality of databases through the input and output interface 130.

Next, the processor 150 may normalize the training images stored in the target database (S403). The processor 150 may calculate an average value and a standard deviation of the training images and normalize the training images using the calculated average value and standard deviation.

Next, the processor 150 may normalize the correct answer dimension information stored in the target database (S405). The processor 150 may calculate an average value and a standard deviation of the correct answer dimension information stored in the target database and normalize the correct answer dimension information using the calculated average value and standard deviation.

Next, the processor 150 may match the average value and standard deviation calculated in the process of normalizing the training images stored in the target database with the depth information stored in the target database, and store the average values and standard deviations in a memory 140 (S407).

Next, the processor 150 may train a dimension prediction model using the normalized training images and the normalized correct answer dimension information as training data (S409). The processor 150 may train the dimension prediction model through supervised learning. In the case of a general image-based dimension prediction model, a dimension of an object may be estimated by training a dimension prediction model in a limited photographing environment and inputting an image captured in the same photographing environment as the limited photographing environment during the training process to the trained dimension prediction model, and thus there is a problem in that images captured in different photographing environments cannot be used in a learning or inference process.

On the other hand, in the case of the present invention, the training images are normalized and the dimension prediction model is trained using the normalized training images, and thus images captured in various photographing environments may be used as training data for the dimension prediction model. In the present invention, when a dimension prediction model suitable for a new photographing environment is generated, the dimension prediction model suitable for the new photographing environment may be generated with only a small number of training images through transfer learning for a pre-trained dimension prediction model.

Next, the processor 150 may calculate conversion parameters using the normalized training images, the normalized correct answer dimension information, and the dimension prediction model (S411), and match the calculated conversion parameters with the depth information and store the calculated conversion parameters in the memory 140

(S413). Here, the conversion parameters may be parameters for converting a normalized estimated dimension estimated from a training image through a dimension prediction model into a correct answer dimension corresponding to the training image. In this case, the processor 150 may calculate values that minimize a loss defined as an error between the normalized estimated dimension estimated from the training image through the dimension prediction model and the correct answer dimension corresponding to the training image as the conversion parameters. A loss function of the conversion parameters may be defined by Equation 2 below, and FIG. 5 is a conceptual diagram illustrating a process of calculating the conversion parameters.

$$L_j(s_j, c_j) = \arg \min_{s,c} dist(sd + c, d^*) \qquad \text{[Equation 2]}$$

Here, s may denote a scale parameter included in the conversion parameters, c may denote a shift parameter included in the conversion parameters, d may denote normalized estimated dimension information generated from the training image through the dimension prediction model, and d* may denote the correct answer dimension information corresponding to the training image.

Next, the processor 150 may determine whether the learning has been completed for all the databases (S415). When it is not determined that the learning has been completed for all the databases, the processor 150 may return to operation S401 and perform the training on the databases on which the learning has not been performed.

When it is determined that the learning has been completed for all the databases, the processor 150 may train a normalization model using the depth information stored by being matched with the average value and standard deviation stored in the memory 140 (S417). The processor 150 may train the normalization model using information about the average value and standard deviation and the depth information stored in the memory 140 as training data. That is, the normalization model may train relationship information about the average value and standard deviation according to the depth information, and normalize an input image using the trained relationship information.

Next, the processor 150 may train the denormalization model using the depth information stored by being matched with the conversion parameters stored in the memory 140 (S419). The processor 150 may train the denormalization model using information about the conversion parameters and the depth information stored in the memory 140 as training data. That is, the denormalization model may train the relationship information about the conversion parameters according to the depth information, and denormalize input normalized estimated dimension information using the trained relationship information. FIG. 6 is a conceptual diagram illustrating a process of calculating the denormalization model.

As described above, in the apparatus and method for measuring the dimension according to the embodiment of the present invention, a dimension of an object may be estimated with high accuracy from a 2D image captured through a single camera using a trained dimension prediction model through deep learning. Further, in the apparatus and method for measuring the dimension according to the embodiment of the present invention, by applying a method in which a 2D image captured through a single camera is normalized and a dimension prediction model is trained using the normalized image, even when an environment in which the image is captured changes, a dimension prediction model suitable for a new photographing environment may be easily generated through transfer learning for the existing dimension prediction model.

Implementations described herein may be implemented, for example, as a method, a process, a device, a software program, a data stream, or a signal. Although discussed only in the context of a single form of implementation (e.g., only as a method), implementations of the features discussed may also be implemented in other forms (e.g., devices or programs). The device may be implemented with appropriate hardware, software, firmware, etc. The method may be implemented in a device such as a processor, which is generally a processing device including a computer, microprocessor, integrated circuit, or programmable logic device. The processors also include communication devices such as computers, cell phones, portable/personal digital assistants (PDAs) and other devices that facilitate communication of information between end-users.

According to one aspect of the present invention, in the present invention, a dimension of an object can be estimated with high accuracy from a 2D image captured through a single camera using a trained dimension prediction model through deep learning.

Further, according to one aspect of the present invention, in the present invention, by applying a method in which a 2D image captured through a single camera is normalized and a dimension prediction model is trained using the normalized image, even when an environment in which the image is captured changes, a dimension prediction model suitable for a new photographing environment may be easily generated through transfer learning for the existing dimension prediction model.

Meanwhile, effects of the present invention are not limited to the above-described effects and other effects that are not described may be clearly understood by those skilled in the art from the above detailed description.

While the present invention has been described with reference to embodiments illustrated in the accompanying drawings, the embodiment should be considered in a descriptive sense only, and it should be understood by those skilled in the art that various alterations and other equivalent embodiments may be made. Therefore, the scope of the present invention should be defined by only the following claims.

What is claimed is:

1. A method of measuring a dimension, comprising: photographing a target object and generating an image; training a normalization model, a dimension prediction model, and a denormalization model using a plurality of databases corresponding to a respective plurality of photographing environments stored separately, wherein each of the plurality of databases store training images, correct answer dimension information about the training images, and depth information; normalizing the image using the trained normalization model; generating normalized estimated dimension information about the target object from the normalized image using the trained dimension prediction model; and converting the normalized estimated dimension information into estimated dimension information using the trained denormalization model.

2. The method of claim 1, wherein, in the normalizing of the image, depth information about the target object is generated, and the image is normalized using the trained normalization model and the depth information.

3. The method of claim 2, wherein, in the normalizing of the image, an average value and standard deviation corresponding to the depth information are detected using the trained normalization model, and the image is normalized using the detected average value and standard deviation.

4. The method of claim 1, wherein, in the converting of the normalized estimated dimension information, depth information about the target object is generated, and the normalized estimated dimension information is denormalized using the trained denormalization model and the depth information and converted into the estimated dimension information.

5. The method of claim 4, wherein, in the converting of the normalized estimated dimension information, conversion parameters corresponding to the depth information are detected using the trained denormalization model, and the normalized estimated dimension information is denormalized using the detected conversion parameters.

6. The method of claim 1, wherein the training of the normalization model, the dimension prediction model, and the denormalization model includes performing a process, in which the training images and the correct answer dimension information stored in the plurality of databases are normalized and the dimension prediction model is trained using the normalized training images and the normalized correct answer dimension information, on each of the plurality of databases.

7. The method of claim 6, wherein the training of the normalization model, the dimension prediction model, and the denormalization model further includes:
performing a process, in which an average value and a standard deviation calculated in the process of normalizing the training images are matched with the depth information and stored, on each of the plurality of databases; and
training the normalization model using the stored information.

8. The method of claim 6, wherein the training of the normalization model, the dimension prediction model, and the denormalization model further includes:
performing a process, in which conversion parameters are calculated using the normalized training images and the normalized correct answer dimension information, and the dimension prediction model and the conversion parameters are matched with the depth information and stored, on each of the plurality of databases; and
training the denormalization model using the stored information.

9. An apparatus for measuring a dimension, comprising: a camera; a sensor; and a processor connected to the camera and the sensor, wherein the processor photographs a target object to generate an image through the camera, trains a normalization model, a dimension prediction model, and a denormalization model using a plurality of databases corresponding to a respective plurality of photographing environments stored separately, wherein each of the plurality of databases store training images, correct answer dimension information about the training images, and depth information, normalizes the image using the trained normalization model, generates normalized estimated dimension information about the target object from the normalized image using the trained dimension prediction model, and converts the normalized estimated dimension information into estimated dimension information using the trained denormalization model.

10. The apparatus of claim 9, wherein the processor generates depth information about the target object and normalizes the image using the trained normalization model and the depth information.

11. The apparatus of claim 10, wherein the processor detects an average value and standard deviation corresponding to the depth information using the trained normalization model, and normalizes the image using the detected average value and standard deviation.

12. The apparatus of claim 9, wherein the processor generates depth information about the target object, and denormalizes the normalized estimated dimension information using the trained denormalization model and the depth information to convert the normalized estimated dimension information into the estimated dimension information.

13. The apparatus of claim 12, wherein the processor detects conversion parameters corresponding to the depth information using the trained denormalization model, and denormalizes the normalized estimated dimension information using the detected conversion parameters.

14. The apparatus of claim 9, wherein the processor performs a process, in which the training images and the correct answer dimension information stored in the plurality of databases are normalized and the dimension prediction model is trained using the normalized training images and the normalized correct answer dimension information, on each of the plurality of databases.

15. The apparatus of claim 14, wherein the processor performs a process, in which an average value and a standard deviation calculated in the process of normalizing the training images are matched with the depth information and stored, on each of the plurality of databases, and trains the normalization model using the stored information.

16. The apparatus of claim 14, wherein the processor performs a process, in which conversion parameters are calculated using the normalized training images and the normalized correct answer dimension information, and the dimension prediction model and the conversion parameters are matched with the depth information and stored, on each of the plurality of databases, and trains the denormalization model using the stored information.

17. An apparatus for measuring a dimension, comprising: a camera configured to photograph a target object and generate a two-dimensional (2D) image; a sensor configured to detect a distance to a place where the target object is placed and generate depth information; and a processor configured to train a normalization model, a dimension prediction model, and a denormalization model using a plurality of databases corresponding to a respective plurality of photographing environments stored separately, wherein each of the plurality of databases store training images, correct answer dimension information about the training images, and the depth information, normalize the 2D image generated through the camera using the depth information and the trained normalization model, generate normalized estimated dimension information about the target object from the normalized image using the trained dimension prediction model, and convert the normalized estimated dimension information into estimated dimension information using the depth information and the trained denormalization model.

* * * * *